US009860901B2

(12) United States Patent
Sato

(10) Patent No.: US 9,860,901 B2
(45) Date of Patent: Jan. 2, 2018

(54) TRANSMISSION OF DATA TO RECEPTION DEVICES

(75) Inventor: Katsuyuki Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/033,383

(22) Filed: Feb. 23, 2011

(65) Prior Publication Data

US 2011/0216246 A1 Sep. 8, 2011

(30) Foreign Application Priority Data

Mar. 2, 2010 (JP) .................................. 2010-045552

(51) Int. Cl.
*H04L 27/00* (2006.01)
*G10L 19/00* (2013.01)
*H04L 27/04* (2006.01)
*H04N 5/38* (2006.01)
*H04W 72/04* (2009.01)

(52) U.S. Cl.
CPC .............................. *H04W 72/0486* (2013.01)

(58) Field of Classification Search
CPC ...... H04N 5/38; H04N 5/4401; H04N 5/0675; H04N 5/40; H04N 21/2383
USPC .............................. 348/723; 709/224; 725/98
See application file for complete search history.

(56) References Cited

U.S. PATENT DOCUMENTS

| 6,788,646 B1 * | 9/2004 | Fodor ................. H04L 12/5602 370/229 |
| 8,861,932 B2 * | 10/2014 | Shaw ................. H04N 21/2221 386/239 |
| 2007/0258460 A1 * | 11/2007 | Momtahan et al. ....... 370/395.2 |
| 2007/0288651 A1 * | 12/2007 | Nassor ............. H04N 21/23655 709/231 |
| 2008/0127285 A1 * | 5/2008 | Broberg ........................ 725/105 |
| 2008/0129879 A1 * | 6/2008 | Shao et al. .................... 348/723 |
| 2008/0163315 A1 * | 7/2008 | Liwerant et al. ............... 725/98 |
| 2009/0265458 A1 * | 10/2009 | Baker et al. .................. 709/224 |
| 2010/0248759 A1 * | 9/2010 | Bettis et al. .................. 455/466 |

FOREIGN PATENT DOCUMENTS

JP 2001-359200 A 12/2001

* cited by examiner

*Primary Examiner* — Neil Mikeska
(74) *Attorney, Agent, or Firm* — Chip Law Group

(57) ABSTRACT

A transmission device includes: a communication unit that communicates with a plurality of reception devices; a transmission data setting unit that compares the number of the reception devices as transmission targets of transmission data representing content and a predetermined threshold value and sets the transmission data to be transmitted to the reception devices to each reception device based on a result of the comparison such that a transmission rate for transmission that represents an amount of data transmission necessary to transmit the transmission data to the reception devices does not exceed a reference transmission rate representing an amount of data transmission at which data can be transmitted in the communication, and the transmission data having relatively high reproduction quality is transmitted to the reception devices as the transmission targets; and a transmission processing unit that concurrently transmits the transmission data set by the transmission data setting unit to the corresponding reception devices as the transmission targets.

18 Claims, 8 Drawing Sheets

FIG.3

| IDENTIFIER | LENGTH | REQUEST COMMAND | PARAMETER ... |

FIG.4

| IDENTIFIER | LENGTH | REQUEST COMMAND | RESPOND ... |

FIG.6

| IDENTIFIER | LENGTH | CODEC INFORMATION | TRANSMISSION DATA ··· |

TRANSMISSION OF DATA TO RECEPTION DEVICES

BACKGROUND OF THE INVENTION

1. Field of the Invention

The present invention relates to a transmission device, a data transmitting method, and a communication system.

2. Description of the Related Art

Recently, communication systems in which audio data representing music, sounds, or the like and image data representing images (moving images and still images) are transmitted and received between devices through wired communication or wireless communication have come into wide use.

Within these, a technology relating to a communication system that performs data transmission and data reception without exceeding a transmission rate in communication has been developed. Examples of a technology for setting a frequency band of a communication channel based on at least one of the content of transmitted data, the type of a transmission target device, and availability of wireless resources using a transmission device that transmits data include JP-A-2001-359200.

SUMMARY OF THE INVENTION

According to the technology in the related art (hereinafter, it may be referred to as "the technology in the related art") relating to a communication system that transmits and receives data without exceeding a transmission rate in communication, a transmission device that transmits data sets the frequency band of a communication channel based on at least one of the content of transmitted data, the type of a transmission target device, and the availability of wireless resources. Accordingly, there is a possibility that the transmission device using the technology in the related art (hereinafter, it may be referred to as "the transmission device in the related art") can transmit data to be transmitted (hereinafter, referred to as "transmission data") to one reception device as a transmission target of the transmission data without exceeding a transmission rate at which the data can be transmitted.

However, a communication system that transmits and receives data through communication is not limited to a system in which a transmission device transmits transmission data to one reception device. For example, as a communication system, a system that concurrently transmits transmission data corresponding to each reception device to a plurality of reception devices as transmission targets of the transmission data may be considered. By concurrently transmitting the transmission data to the plurality of reception devices as the transmission targets by using the transmission device as described above, for example, a communication system capable of reproducing the same content such as the same sound (including music; hereinafter, the same) or the same image (a moving image or a still image; hereinafter, the same) in the plurality of reception devices is realized. Hereinafter, the description will be presented assuming that the transmission data is data representing content such as a sound or an image.

Here, in the technology in the related art, there is no consideration for the above-described transmission system in which the transmission device concurrently transmits transmission data to a plurality of reception devices as transmission targets. Accordingly, in a case where the technology in the related art is applied to the above-described communication system, a case where a transmission rate (hereinafter, referred to as a "transmission rate for transmission") representing the amount of data transmission that is necessary to transmit the transmission data transmitted from the transmission device exceeds a transmission rate (hereafter, referred to as a "reference transmission rate) representing the amount of data transmission for which data can be transmitted in communication may occur. In a case where the transmission rate for transmission exceeds the reference transmission rate as described above, for example, an undesirable situation such as an interrupt in a sound or an image reproduced in the reception devices may occur.

In the above-described communication system in which the transmission device concurrently transmits the transmission data to a plurality of reception devices as transmission targets, as methods of preventing the above-described undesirable situation, the following method as represented in (a) to (d) may be considered.

(a) The transmission device limits the number of the reception devices as the transmission targets.

(b) The transmission device uniformizes the transmission data transmitted to the reception devices as compressed audio data (generally, the sound quality (an example of the reproduction quality) is lower than that of uncompressed audio data) (in a case where the transmission data is audio data).

(c) The transmission device uniformizes the transmission data transmitted to the reception devices as image data having a lower image quality (an example of the reproduction quality) such as image data having a lower resolution and/or image data in a compression format having a higher compression rate (in a case where the transmission data is image data representing a moving image).

(d) The transmission device uniformizes the transmission data transmitted to each reception device as image data having a lower image quality (an example of the reproduction quality) such as image data having a smaller data size (in a case where the transmission data is image data representing a still image).

For example, by using the method as represented in (a) and/or (b) to (d) described above, it is possible to increase (that is, to maintain spare bandwidth) a difference between the reference transmission rate and the transmission rate for transmission (hereinafter, referred to as a "differential transmission rate"). Accordingly, for example, by using the above-described methods, in the above-described communication system in which the transmission data is concurrently transmitted, the undesirable situation that may occur as the transmission rate for transmission exceeds the reference transmission rate can be prevented. In addition, in the above-described communication system using the above-described method, for example, even in a case where the reference transmission rate decreases due to a decrease in the throughput in the communication, the occurrence of the above-described undesirable situation can be prevented.

However, in a case where the occurrence of the undesirable situation is prevented by using the above-described method (a), the number of the reception devices as the transmission targets should be limited to a large extent. Accordingly, in a case where the above-described method (a) is used, user convenience using the communication system may be degraded.

In addition, in a case where the occurrence of the undesirable situation is prevented by using the methods (b) to (d) described above, even when there is an actual spare bandwidth, the transmission data having a lower reproduction quality such as the transmission data having a lower sound quality is transmitted to all the reception devices as the transmission targets. Accordingly, in a case where the above-described methods (b) to (d) are used, it is difficult to attain transmission of the transmission data having a relatively high reproduction quality to the reception devices by maximally utilizing the communication channel capacity in the communication.

In addition, the number of the reception devices as the transmission targets and maintenance of the reproduction quality in reproducing the transmission data in all the reception devices of the communication system are inversely proportional to each other. Accordingly, in a case where the above-described method (a) and the above-described methods (b) to (d) are combined, when the limitation on the number of the reception devices as the transmission targets is loosened, it is difficult to attain transmission of the transmission data having a higher reproduction quality to the reception devices. In addition, in a case where the above-described method (a) and the above-described methods (b) to (d) are combined, when the transmission data having a higher reproduction quality is transmitted to the reception devices, the limitation on the number of the reception devices as the transmission targets become stricter. Accordingly, the possibility of the occurrence of the degradation of user convenience is increased.

Accordingly, even in a case where the above-described methods (a) to (d) are used, in the communication system in which the transmission data is concurrently transmitted to a plurality of the reception devices, it is difficult to secure the reproduction quality in reproducing the transmission data by using the reception devices while preventing the degradation of user convenience.

Thus, it is desirable to provide a transmission device, a data transmitting method, and a communication system, which are new and enhanced, capable of concurrently transmitting transmission data having relatively high reproduction quality to the reception devices while preventing degradation of user convenience.

According to an embodiment of the present invention, there is provided a transmission device including: a communication unit that communicates with a plurality of reception devices; a transmission data setting unit that compares the number of the reception devices as transmission targets of transmission data representing content and a predetermined threshold value and sets the transmission data to be transmitted to the reception devices to each reception device based on a result of the comparison such that a transmission rate for transmission that represents an amount of data transmission necessary to transmit the transmission data to the reception devices does not exceed a reference transmission rate representing an amount of data transmission at which data can be transmitted in the communication, and the transmission data having relatively high reproduction quality is transmitted to the reception devices as the transmission targets; and a transmission processing unit that concurrently transmits the transmission data set by the transmission data setting unit to the corresponding reception devices as the transmission targets.

According to the above-described transmission device, the transmission data having relatively high reproduction quality can be concurrently transmitted to the reception devices while preventing degradation of user convenience.

The above-described transmission device may further include: a request transmitting unit that transmits a device information transmitting request for requesting device information used for identifying the reception devices to the reception devices as the transmission targets to be transmitted. In such a case, the transmission data setting unit sets the transmission data to each reception device based on the device information transmitted from the reception devices in response to the device information transmitting request received by the communication unit in a case where the number of the reception devices as the transmission targets is equal to or greater than the predetermined threshold value or a case where the number of the reception devices as the transmission targets is greater than the predetermined threshold value, and respectively sets the transmission data having relatively high reproduction quality to the reception devices as the transmission targets in a case where the number of the reception devices as the transmission targets is less than the predetermined threshold value or a case where the number of the reception devices as the transmission targets is equal to or less than the predetermined threshold value.

In addition, the above-described transmission device may further include: a storage unit that stores reproduction capability information representing content reproducing capabilities of each reception device. In such a case, the transmission data setting unit specifies the content reproducing capabilities of the reception devices corresponding to the device information based on the received device information and the reproduction capability information and sets the transmission data to be transmitted to the reception devices based on the specified content reproducing capabilities of the reception devices.

In addition, in the above-described transmission device, it may be configured such that, when receiving the device information, the request transmitting unit may transmit a reproduction capability information acquiring request requesting the reproduction capability information corresponding to the received device information to an external device that stores the reproduction capability information representing content reproducing capabilities of the reception devices to be transmitted, and the transmission data setting unit specifies the content reproducing capabilities of the reception devices corresponding to the device information based on the received device information and the received reproduction capability information and sets the transmission data to be transmitted to the reception devices based on the specified content reproduction capabilities of the reception devices.

In addition, in the above-described transmission device, the transmission data setting unit may set the transmission data such that the transmission data having a higher reproduction quality is transmitted to the reception device having a higher reproduction capability.

In addition, in the above-described transmission device, the transmission data setting unit may set uncompressed audio data or audio data compressed by using a predetermined compression method as the transmission data in a case where the transmission data to be transmitted is sound data representing sounds.

In addition, in the above-described transmission device, the transmission data setting unit may set any one type of image data from among a plurality of types of image data having a plurality of resolutions and/or different compression formats as the transmission data in a case where the transmission data to be transmitted is image data representing a moving image.

In addition, in the above-described transmission device, the transmission data setting unit may set anyone type of image data from among a plurality of types of image data having different data sizes as the transmission data in a case where the transmission data to be transmitted is image data representing a still image.

According to another embodiment of the present invention, there is provided a data transmitting method including the steps of: comparing the number of reception devices as transmission targets of transmission data representing content and a predetermined threshold value and setting the transmission data to be transmitted to the reception devices for each reception device based on a result of the comparison such that a transmission rate for transmission that represents an amount of data transmission necessary to transmit the transmission data to the reception devices which does not exceed a reference transmission rate representing an amount of data transmission at which data can be transmitted in communication, and the transmission data having relatively high reproduction quality is transmitted to the reception devices as the transmission targets; and concurrently transmitting the transmission data set in the comparing of the number of reception devices and a predetermined threshold value and the setting of the transmission data to the corresponding reception devices as the transmission targets.

According to the above-described method, the transmission data having relatively high reproduction quality can be concurrently transmitted to the reception devices while preventing degradation of user convenience.

According to still another embodiment of the present invention, there is provided a communication system including: a transmission device; and a plurality of reception devices that can communicate with the transmission device. The transmission device includes a communication unit that communicates with a plurality of reception devices, a transmission data setting unit that compares the number of the reception devices as transmission targets of transmission data representing content and a predetermined threshold value and sets the transmission data to be transmitted to each reception device based on a result of the comparison such that a transmission rate for transmission that represents an amount of data transmission necessary to transmit the transmission data to the reception devices does not exceed a reference transmission rate representing an amount of data transmission at which data can be transmitted in the communication, and the transmission data having relatively high reproduction quality is transmitted to the reception devices as the transmission targets, and a transmission processing unit that concurrently transmits the transmission data set by the transmission data setting unit to the corresponding reception devices as the transmission targets.

According to such a configuration, a communication system capable of concurrently transmitting the transmission data having relatively high reproduction quality to the reception devices while preventing degradation of user convenience can be realized.

According to the embodiments of the present invention, the transmission data having relatively high reproduction quality can be concurrently transmitted to the reception devices while preventing degradation of user convenience.

BRIEF DESCRIPTION OF THE DRAWINGS

FIG. 3 is a diagram illustrating an example of the format of various requests that are transmitted by a transmission device according to an embodiment of the invention.

FIG. 4 is a diagram illustrating an example of the format of a response to various requests transmitted by the reception device according to an embodiment of the present invention.

FIG. 6 is a diagram illustrating an example of the format of data transmitted by a transmission device according to an embodiment of the present invention.

DESCRIPTION OF THE PREFERRED EMBODIMENTS

Figure 1:
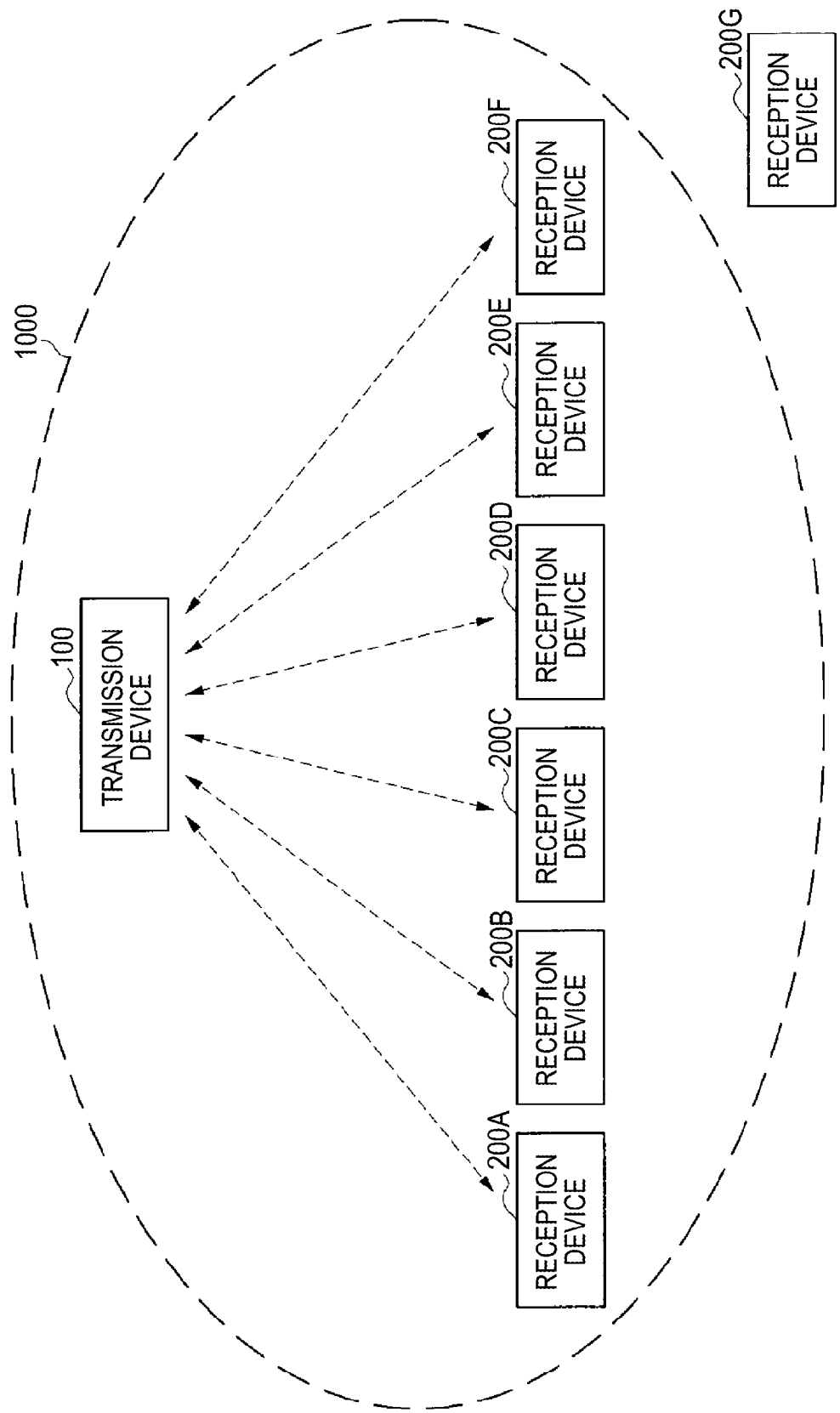
FIG. 1 is a schematic diagram illustrating an overview of a communication system according to an embodiment of the present invention.

Hereinafter, preferred embodiments of the present invention will be described in detail with reference to the accompanying drawings. In the description here and drawings, the same reference numeral is assigned to constituent elements substantially having the same function and configuration, and duplicate description thereof will be omitted.

Hereinafter the description will be presented in the following order.

1. Approach According To Embodiment of Present Invention

2. Communication System According To Embodiment of Present Invention

3. Program According To Embodiment of Present Invention (Approach According to Embodiment of Present Invention)

Before the configuration of each device configuring a communication system (hereinafter, it may be referred to as a "communication system 1000") according to an embodiment of the present invention is described, a data transmission approach according to an embodiment of the present invention will be described.

[Overview of Communication System 1000]

Before describing an overview of a data transmission approach according to an embodiment of the present invention, to be described later, an overview of a communication system 1000 will be described. FIG. 1 is a schematic diagram illustrating an overview of a communication system 1000 according to an embodiment of the present invention. The communication system 1000 includes a transmission device 100 and reception devices 200A, 200B, . . . (here, these may be collectively referred to as a "reception device 200").

The transmission device 100 and the reception device 200 communicate with each other, for example, through wired communication such as a LAN (Local Area Network) or wireless communication such as IEEE802.11g or IEEE802.15. Here, FIG. 1 shows a case where the transmission device 100 and the reception devices 200 communicate with each other through wireless communication. Although not shown in FIG. 1, for example, in a case where IEEE802.11g is used as wireless communication, the transmission device 100 and the reception devices 200 communicate with each other through a relay device serving as an access point.

In the communication system 1000, various requests (commands) such as a communication request (to be described later), a device information transmitting request (to be described later), and a reproduction capability information acquiring request (to be described later), information (data) transmitted in accordance with such various requests, transmission data, and the like are transmitted and received, for example, through "UDP unicast packets". In addition, the communication system 1000 according to the embodiment of the present invention may perform transmission or reception of various requests and the like in an arbitrary format, for example, complying with a DLNA (Digital Living Network Alliance) standard. In the communication system 1000 according to the embodiment of the present invention, the various requests are not limited to those described above. Examples of such various requests include a transmission start notification of transmission data, a transmission stop request of transmission data, a retransmission request of transmission data, and the like.

For example, the transmission device 100 transmits communication requests to the reception devices that can be transmission targets, and each reception device 200 makes a response indicating performing communication in accordance with the communication request, whereby the communication system 1000 according to the embodiment of the present invention is formed. In other words, the transmission device 100 requests the reception devices 200 to participate in the system, and the reception devices 200 respectively respond to the request, whereby the communication system 1000 is formed. FIG. 1 shows an example in which six reception devices 200 including a reception device 200A to a reception device 200F configure the communication system 1000, and a reception device 200G does not configure the communication system 1000.

Hereinafter, overviews of the transmission device 100 and the reception device 200 of the communication system 1000 shown in FIG. 1 as an example will be described. In addition, for example, in a case where the reception device 200A shown in FIG. 1 transmits a communication request to the transmission device 100 or another reception device 200, it may be configured such that the reception device 200A shown in FIG. 1 serves as a transmission device, and the transmission device 100 shown in FIG. 1 serves as a reception device.

The transmission device 100, in the communication system 1000, performs the role of transmitting transmission data to the reception devices 200 (that is, the reception devices 200 as transmission targets of the transmission data, and hereinafter, it may be referred to as a "transmission target device") configuring the communication system 1000. More specifically, the transmission device 100 sets the transmission data to be transmitted to each transmission target device for each transmission target device. Then, the transmission device 100 transmits the set transmission data to be transmitted to the transmission target devices concurrently.

Here, the transmission data according to the embodiment of the present invention, for example, is data that represents content of audio, an image, or the like such as audio data, moving image data, or still image data. Hereinafter, data representing content such as audio or an image may be collectively referred to as "content data". In addition, hereinafter, a case where the transmission data transmitted from the transmission device 100 to each transmission target device 200 is audio data will be mainly described as an example.

The reception device 200 receives transmission data transmitted from the transmission device 100 and reproduces the received transmission data. Here, as an example of such reproduction performed by the reception device 200, there is stream reproduction. As each reception device 200 performs stream reproduction of the transmission data concurrently transmitted from the transmission device 100, reproduction of the same content by using a plurality of the reception devices 200, for example, installed in different rooms is realized in the communication system 1000. The method of reproducing the data received by a plurality of the reception devices 200 is not limited to stream reproduction. For example, the reception device 200 according to the embodiment of the present invention may be configured to store the received transmission data in a storage unit (to be described later) or the like and reproduce the stored transmission data.

In addition, the reception device 200 is not limited to receiving transmission data transmitted from the transmission device 100 and reproducing the received transmission data. For example, the reception device 200 may be configured so as to reproduce content data that is acquired from various recording media including as an optical disc such as a DVD disc, a magnetic recording medium such as a hard disk, a USB (Universal Serial Bus) memory, and the like or content data that is acquired through a tuner, an external input terminal, or the like.

The communication system 1000, for example, includes the transmission device 100 and the reception devices 200 as described above and concurrently transmits the transmission data to a plurality of the reception devices 200, and reproduces content corresponding to the transmission data in the reception devices 200. Hereinafter, a data transmission approach according to an embodiment of the present invention in the communication system 1000 shown in FIG. 1 as an example will be described.

[Overview of Data Transmission Approach]

As described above, even when any of the methods represented in the related art and (a) to (d) described above is used, it is difficult to secure a high reproduction quality in reproducing the transmission data is realized by the reception devices while preventing degradation of user convenience in a communication system in which the transmission data is concurrently transmitted to a plurality of the reception devices.

For example, in a case where communication between the transmission device and each reception device as a transmission target is wireless communication employing IEEE802.11g, a theoretical value of the transmission rate is 54 [Mbps]. However, since throughput decreases due to a decrease in the radio field intensity or the like, an effective value of the transmission rate (that is, a reference transmission rate) is about 20 to 30 [Mbps]. Here, in a case where the transmission data transmitted from the transmission device is LPCM (Linear Pulse-Code Modulation) audio data (for example, in the case of LPCM having a transmission rate of 1.4 [Mbps]), even when the wireless environment is good in some degree (for example, when the reference transmission rate is 25 [Mbps]), about only eight reception devices can receive the transmission data in accordance with the following Expression (1). In addition, considering that the wireless environment is not limited to being maintained at the above-described environment, the number of the reception devices that can stably receive the transmission data in the above-described case is about four or five.

$$25 \text{ [Mbps]}/(1.4 \text{ [Mbps]} \times 2) = 8.9 \quad (1)$$

Here, as shown in (b) described above, when the transmission data transmitted by the transmission device is, for example, an audio signal of DPCM (Differential Pulse Code Modulation) that is acquired by compressing the LPCM audio data, a differential transmission rate can be increased, whereby there is spare bandwidth. Accordingly, in the above-described case, the transmission data can be transmitted to more reception devices. However, in the above-described case, since compressed audio data is transmitted as the transmission data to all the reception devices as transmission targets, the sound quality of the entirety of the communication system decreases.

Thus, in the communication system 1000 according to the embodiment of the present invention, the transmission device 100 sets transmission data to be transmitted to each reception device 200 as a transmission target for each reception device 200 and concurrently transmits the set transmission data to each reception device 200. By setting the transmission data for each reception device 200 by using the transmission device 100, it is possible not to allow the transmission rate for transmission to exceed the reference transmission rate and to realize transmission of transmission data having a high reproduction quality for each reception device 200 as a transmission target in the communication system 1000.

Accordingly, the communication system 1000 capable of concurrently transmitting transmission data having relatively high reproduction quality to the reception devices 200 is realized while preventing the degree of user convenience from being lowered.

More specifically, in the communication system 1000, for example, by performing the process of (1) and the process of (2) represented below, the communication device 100 transmits transmission data having relatively high reproduction quality to the reception device 200 while preventing the transmission rate for transmission from exceeding the reference transmission rate. Here, the process of (1) and the process of (2) represented below are examples of processes relating to a data transmitting method according to an embodiment of the present invention.

(1) Transmission Data Setting Process

The transmission device 100 compares the number of the reception devices 200 (hereinafter it may be represented as the number of transmission target devices) as transmission targets and a predetermined threshold value. Then, the transmission device 100 sets transmission data for each reception device 200 based on the comparison result such that the transmission rate for transmission does not exceed the reference transmission rate, and the transmission data having relatively high reproduction quality is transmitted to the reception devices 200 as the transmission targets.

More specifically, the transmission device 100 sets a plurality of content data having different reproduction qualities as candidates of the transmission data to be transmitted to the reception device 200 and sets any one item of content data to each reception device 200 based on the comparison result.

For example, in a case where the number of the transmission target devices is less than the predetermined threshold value (or in a case where the number of the transmission target devices is equal to or less than the predetermined value; hereinafter, the same), the transmission device 100 sets transmission data having a higher reproduction quality to each reception device 200 as a transmission target. In other words, the predetermined threshold value used in the process of (1) by the transmission device 100, for example, is a value that is used for determining whether or not transmission data having a higher reproduction quality can be set to all the reception devices 200 as transmission targets. Here, as the predetermined threshold value according to the embodiment of the present invention, for example, a maximum value of the number of the transmission target devices, for which the transmission rate necessary to concurrently transmit the transmission data having a higher reproduction quality out of the transmission data to the reception devices 200 does not exceed the reference transmission rate set in accordance with the transmission method, is set. In addition, it is apparent that the method of setting the predetermined threshold value according to the embodiment of the present invention, which is used in the process of (1) by the transmission device 100, is not limited to that described above.

In addition, for example, in a case where the number of the transmission target devices is equal to or greater than a threshold value (or in a case where the number of the transmission target devices is greater than a predetermined threshold value; hereinafter the same), the transmission device 100 sets a plurality of transmission data having different reproduction qualities so as to be mixed together such that transmission data having relatively high reproduction quality is set to more reception devices 200 out of the reception devices 200 as the transmission targets. Here, as a method of setting transmission data in the transmission devices 100, for example, there is a method in which the number of transmission target devices, to which transmission data having relatively high reproduction quality is transmitted, is determined, and the transmission data having the relatively high reproduction quality is set to arbitrary reception devices 200, which correspond to the determined number, out of the transmission target devices. In the above-described case, to other reception devices 200 to which the transmission data having the relatively high reproduction quality is not set, transmission data having a lower reproduction quality such as DPCM audio data is set.

The method of setting transmission data in a case where the number of the transmission target devices is equal to or greater than a predetermined threshold value is not limited to that described above. For example, the transmission device 100 may acquire device information from each reception device 200 as a transmission target by transmitting a device information transmitting request to be described later, specify the content reproducing capability of each reception device 200 based on the device information, and set the transmission data having a higher reproduction quality to the reception device 200 having a higher reproduction capability.

Here, the device information according to the embodiment of the present invention is information (data) used for identifying the reception device 200. Examples of the device information include information representing the model name of the reception device 200, information representing the capability of equipped devices, and information representing the function of reproducing content data. In addition, examples of the information representing the capability of equipped devices include information representing the output capability of a speaker or the capability of an amplifier (digital or analog), and screen size information. In addition, examples of the information representing the function of reproducing content data include the resolution or codec of reproducible image data and sampling rates of reproducible audio data.

In a case where the content reproducing capability can be directly specified from the device information acquired from each reception device 200, the transmission device 100 relatively specifies the content reproducing capabilities of the reception devices 200, for example, by comparing the device information acquired from the reception devices 200. Here, as an example of a method of specifying the relative content reproducing capabilities that is used in the transmission device 100, there is a method in which the reception devices 200 are aligned in descending order of the reproduction capability, for example, based on information representing the capability of equipped devices included in the acquired device information or information representing the reproduction function of content data. As described above, by aligning the reception devices 200 in descending order of the reproduction capability, the transmission device 100 can set the transmission data having a higher reproduction capability in descending order of the reproduction capability.

In addition, as another example of the method of specifying the relative content reproducing capabilities, there is a method in which the reception devices 200 as transmission targets are classified, for example, into "high-quality reproduction function devices" having a higher reproduction capability and "general-capability reproduction function devices" other than the high-quality reproduction function devices by arranging a threshold value of the capability of the equipped devices or the reproduction function of content data. By classifying the reception devices 200 as the transmission targets in the high-quality reproduction function devices and the general-capability reproduction function devices, as described above, the transmission device 100 can set transmission data having relatively high reproduction quality with priority for the reception devices 200 classified into the high-quality reproduction function devices. Here, in the above-described case, when the number of the reception devices 200 classified into the high-quality reproduction function devices is equal to or greater than a predetermined threshold value (or is greater than a predetermined threshold value), for example, the transmission device 100 selects the reception devices 200 corresponding to a number that is the same as "the predetermined threshold value−1" (or the predetermined threshold value) out of the reception devices 200 classified into the high-quality reproduction function devices. Then, the transmission device 100 sets the transmission data having relatively high reproduction quality to the selected reception devices 200.

For example, by using the above-described method of specifying the relative content reproducing capabilities, the transmission device 100 can set transmission data such that transmission data having relatively high reproduction quality is transmitted to the reception devices 200 having a relatively high reproduction capability.

In addition, the transmission device 100 can specify the reproduction capability of each reception device 200 based on the device information acquired from the reception devices 200 and the reproduction capability information representing the content reproducing capabilities of each reception device 200. More specifically, the transmission device 100 acquires the reproduction capability information of the reception device 200 corresponding to the device information from the storage unit and/or an external device, for example, based on the information, which represents the model name, included in the acquired device information.

Then, the transmission device 100 specifies the reproduction capability of each reception device 200 based on the reproduction capability information of each reception device 200, for example, by using the above-described method of specifying the relative content reproducing capabilities.

Here, the reproduction capability information according to the embodiment of the present invention is stored, for example, in the storage unit (to be described later) or an external device such as a server connected through a network. As the reproduction capability information according to the embodiment of the present invention, the reproduction capability information of content of the reception devices 200 is recorded, for example, in a database (hereinafter, it may be referred to as a "DB") format. However, the reproduction capability information is not limited to being recorded in the database format. Thus, the reproduction capability information may be data in which the reproduction capability information of each of the reception devices 200 is individually recorded.

In a case where the reproduction capability information of the reception device 200 corresponding to the device information out of the reproduction capability information stored in the external device is acquired, the transmission device 100, for example, transmits a reproduction capability information acquiring request that is used to demand transmission of the reproduction capability information corresponding to the received device information to the external device that stores the reproduction capability information. The transmission device 100 can acquire the reproduction capability information of the reception device 200 that corresponds to the device information out of the reproduction capability information stored in the external device by receiving the reproduction capability information transmitted from the external device in accordance with the reproduction capability information acquiring request. Here, the transmission device 100, for example, stores information such as an IP (Internet Protocol) address of the external device storing the reproduction capability information that is used to communicate with the external device in advance and transmits a reproduction capability information acquiring request to the external device by using the stored information.

The transmission device 100 sets the transmission data for each reception device 200 such that the transmission rate for transmission does not exceed the reference transmission rate, and transmission data having relatively high reproduction quality is transmitted to the reception device 200 as the transmission target, for example, by performing the above-described process.

[Example of Transmission Data Set in Transmission Data Setting Process]

Here, an example (an example of content data as candidates of transmission data) that is set by the transmission device 100 in the process of (1) (the transmission data setting process) will be described. As examples of the transmission data that is set by the transmission device 100 in the process of (1), there are the following (A) to (C).

(A) Case where Transmission Data is Audio Data

In a case where the transmission data is audio data that represents sound, the transmission device 100 sets uncompressed audio data such as LPCM audio data or compressed audio data that is compressed by using a predetermined compression method such as DPCM as the transmission data. Here, generally, since uncompressed audio data has a reproduction quality higher than that of compressed audio data, the transmission device 100, for example, sets the uncompressed audio data as the transmission data having relatively high reproduction quality. In addition, the transmission device 100 is not limited to having uncompressed audio data and audio data compressed by using one compression method as candidates of the transmission data. Thus, for example, the transmission device 100 may have uncompressed audio data and audio data compressed by using a plurality of compression methods as candidates of the transmission data.

(B) Case where Transmission Data is Image Data Representing Moving Image

In a case where the transmission data is image data representing a moving image, the transmission device 100, for example, sets anyone type of image data from among a plurality of types of image data having a plurality of resolutions and/or different compression formats as the transmission data. Here, in the above-described case, the transmission data having relatively high reproduction quality is set, for example, based on the resolution, the compression format, and the like of the content data that becomes a source of the transmission data. For example, the transmission device 100 sets the transmission data that does not reduce the resolution of the content data that becomes the source as the transmission data having relatively high reproduction quality and sets the transmission data that reduces the resolution of the content data that becomes the source as the transmission data having relatively low reproduction quality.

(C) Case where Transmission Data is Image Data Representing Still Image

In a case where the transmission data is image data representing a still image, the transmission device 100, for example, sets any one type of image data from among a plurality of types of image data having different data sizes as the transmission data. For example, the transmission device 100 sets the content data itself that becomes the source as the transmission data having relatively high reproduction quality and sets image data acquired by reducing the image size of the content data that becomes the source or compressing image data through lossy compression as the transmission data having relatively low reproduction quality.

The transmission device 100 sets the transmission data, for example, as shown in (A) to (C) described above in the process (the transmission data setting process) of (1). In addition, it is apparent that the transmission data set by the transmission device 100 according to the embodiment of the present invention is not limited to the transmission data shown in (A) to (C) described above.

In addition, the process (the transmission data setting process) of (1) of the transmission device 100 is not limited to setting the transmission data for each reception device 200 such that the transmission rate for transmission does not exceed the reference transmission rate, and the transmission data having relatively high reproduction quality is transmitted to the reception device 200 as the transmission target. For example, on a premise that the transmission rate for transmission does not exceed the reference transmission rate, the transmission device 100 may specify the content reproducing capabilities of each reception device 200 based on the acquired device information and set transmission data having a data format that is appropriate to the reproduction capability of the reception device 200. In a case where the transmission data is set as described above, the differential transmission rate can be further increased, whereby the network load can be suppressed. Therefore, the reproduction capability of each reception device 200 can be exhibited without being pulled back to the reception device 200 that becomes a bottle neck.

(2) Transmission Process

The transmission device 100 concurrently transmits the transmission data set to each reception device 200 as the transmission target in the process (the transmission data setting process) of (1) described above to the corresponding reception device 200.

In the communication system 1000, the transmission data is concurrently transmitted to the reception devices 200, for example, by performing the process (the transmission data setting process) of (1) and the process (the transmission process) of (2) described above by using the transmission device 100. Here, the transmission device 100 sets the transmission data for each reception device 200 in the process (the transmission data setting process) of (1) described above such that the transmission rate for transmission does not exceed the reference transmission rate, and the transmission data having relatively high reproduction quality is transmitted to the reception device 200 as the transmission target. Accordingly, in the communication system 1000, since the transmission rate for transmission does not exceed the reference rate, an undesirable situation such as an interrupt of audio or image reproduced by the reception device 200 does not occur. In addition, in the communication system 1000, transmission data having relatively high reproduction quality is transmitted to the reception devices 200 as the transmission targets.

Therefore, for example, by performing the process (the transmission data setting process) of (1) and the process (the transmission process) of (2) described above by using the transmission device 100, a communication system 1000 capable of transmitting transmission data having relatively high reproduction quality to the reception devices 200 while preventing degradation of user convenience is realized.

[Specific Example of Process Relating to Data Transmission Approach]

Next, the process relating to the data transmission approach according to the embodiment of the present invention in the communication system 1000 will be described more specifically. Hereinafter, a case where the transmission device 100 transmits audio data as the transmission data to the reception devices 200 as the reception targets will be described as an example. In addition, hereinafter, a case where the reception devices 200 configuring the communication system 1000 are classified into the above-described high-quality reproduction function devices and the above-described general-capability reproduction function devices will be described as an example.

Figure 2:
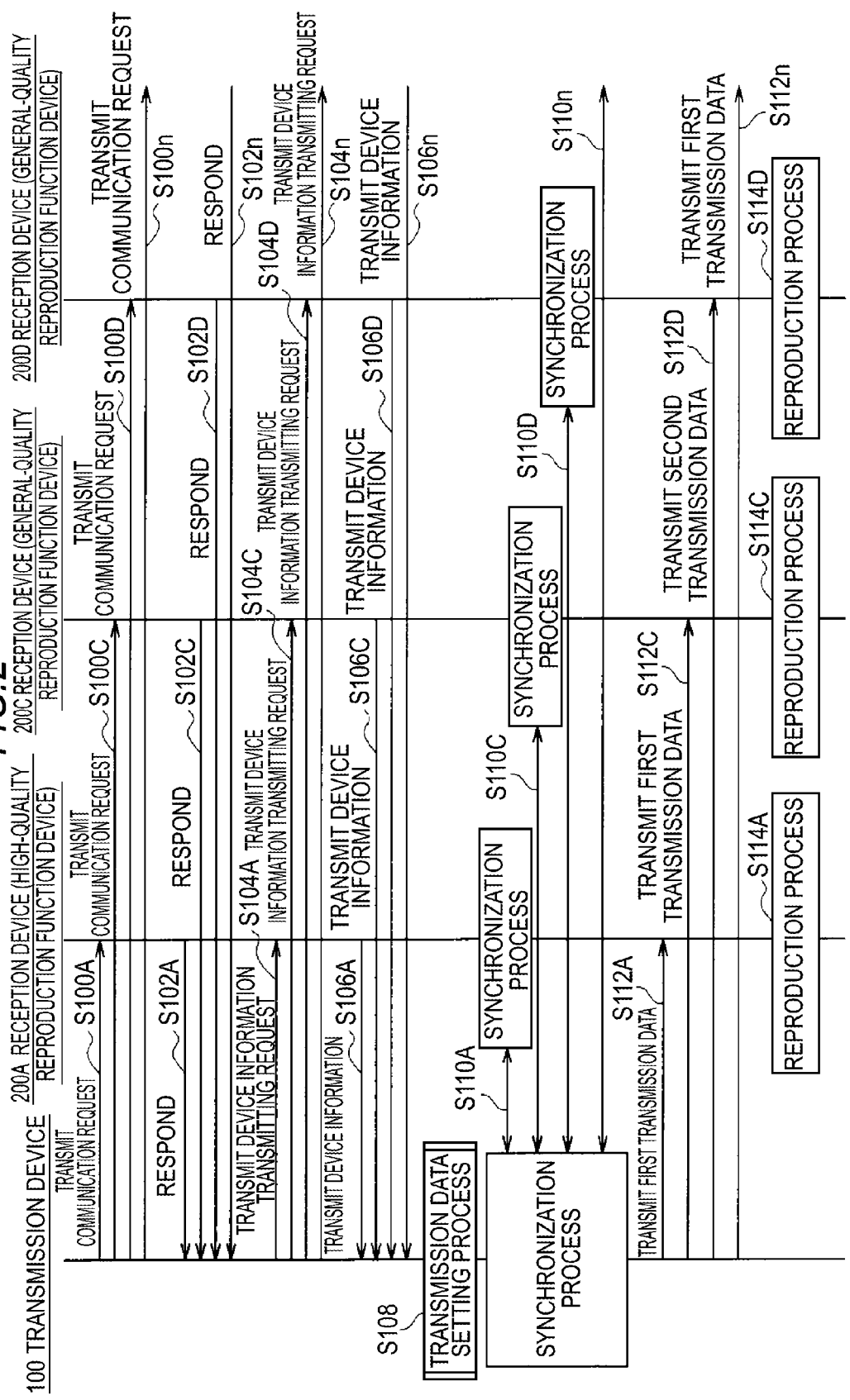
FIG. 2 is a diagram illustrating an example of the process relating to the data transmission approach of a communication system according to an embodiment of the present invention.

FIG. 2 is a diagram illustrating an example of the process relating to the data transmission approach of a communication system 1000 according to an embodiment of the present invention. Here, in FIG. 2, reception devices 200A, 200C, and 200D out of the reception devices 200 shown in FIG. 1 are representatively shown. FIG. 2 shows a case where the reception device 200A serves as the high-quality reproduction function device, and reception devices 200C and 200D serve as the general-capability reproduction function devices.

The transmission device 100 transmits a communication request to each reception device 200 (S100A, S100C, S100D, and S100n; hereinafter, collectively referred to as "S100"), for example, based on a user operation performed for an operation unit (to be described later). Here, the communication request transmitted by the transmission device 100 in Step S100 is a type of a command that is, for example, provided to allow each reception device 200 to transmit a response so as to specify the reception device 200 as the transmission target of transmission data. In addition, the communication request according to the embodiment of the present invention may be perceived as an invitation, which is transmitted from the transmission device 100 to each reception device 200, to participate to the communication system 1000. In other words, the transmission device 100 performs the process of Step S100, and each reception device 200 performs the process of Step S102 to be described later, whereby the communication system 1000 as shown in FIG. 1 is formed.

FIG. 3 is a schematic diagram illustrating an example of the format of various requests that are transmitted by a transmission device 100 according to an embodiment of the invention. As shown in FIG. 3, the reception device 100 transmits a request that, for example, includes an identifier, length information, a request command, and a parameter. Here, the identifier is information that is used for identifying a protocol, and the length information, for example, is a data length of the request command. In addition, the request command represents the content of a command, and the parameter represents a parameter relating to the request command.

The transmission device 100 generates various requests such as a communication request performed in Step S100 or a device information transmitting request to be described later, which is in conformity with the format, for example, shown in FIG. 3 and transmits the various generated requests to the reception devices 200. In addition, it is apparent that the format of the various requests transmitted by the transmission device 100 according to the embodiment of the present invention is not limited to that shown in FIG. 3.

An example of the process relating to the data transmission approach of the communication system 1000 will be described with reference to FIG. 2 again. The reception devices 200 that have received the communication request transmitted from the transmission device 100 in Step S100 transmit responses relating to the communication request to the transmission device 100 (S102A, S102C, S102D, and S102n; hereinafter, collectively referred to as "S102"). Hereinafter, the description will be presented assuming that the reception devices 200A to 200F shown in FIG. 1 transmit responses (responses for participating to the communication system 1000) representing a state such that the transmission data can be received, and the reception device 200G transmits a response (a response for not participating to the communication system 1000) representing a state such that it is difficult to receive the transmission data.

FIG. 4 is a diagram illustrating an example of the format of a response to various requests transmitted by the reception device 200 according to the embodiment of the present invention. As shown in FIG. 4, the reception device 200 transmits a request that, for example, includes an identifier, length information, a request command, and response information. Here, the identifier is information used for identifying a protocol, and the length information, for example, represents a data length of the request command. In addition, the request command represents the command to which the response is made, and the response information represents the content of a response relating to the request command. As an example of the response information generated by the reception device 200, there is data responding to various requests such as ACK (ACKnowledgement) or the device information.

The reception device 200, for example, makes responses to various requests such as the communication request performed in Step S100, for example, in conformity with the format shown in FIG. 4. In addition, it is apparent that the format of various requests transmitted by the transmission device 100 according to the embodiment of the present invention is not limited to that shown in FIG. 3.

An example of the process relating to the data transmission approach of the communication system 1000 will be described with reference to FIG. 2 again. When responses are received from the reception devices 200 in Step S102, the transmission device 100 sets the reception devices 200 that have transmitted the responses representing that the transmission data can be received to be the reception devices 200 as transmission targets of transmission data. The transmission device 100 can specify the number of the transmission target devices by setting the reception devices 200 as the transmission targets based on the responses made in Step S102.

Then, the transmission device 100 transmits a device information transmitting request to the reception devices 200 as the transmission targets (S104A, S104C, S104D, and S104n; hereinafter collectively referred to as "S104"). Here, the device information transmitting request transmitted by the transmission device 100 in Step S104, for example, is a type of command used to allow each reception device 200 to transmit the device information. In addition, in cases where the device information is not used in the process of Step S108 to be described later, which, for example, includes a case where the transmission device 100 sets the transmission data having relatively high reproduction quality to an arbitrary reception device 200 in accordance with a result of comparison between the number of the transmission target devices and a predetermined threshold value or the like, the transmission device 100 may not perform the process of Step S104.

The reception devices 200 that have received the device information transmitting request transmitted from the transmission device 100 in Step S104 transmit the device information that is, for example, stored in the storage unit (to be described later) as responses to the device information transmitting request (S106A, S106C, S106D, and S106n; hereinafter collectively referred to as "S106").

The transmission device 100 that received the device information transmitted from each reception device 200 in Step S106 sets transmission data to be transmitted to the reception devices 200 as the transmission targets (S108; the transmission data setting process).

[One Example of Transmission Data Setting Process]

Figure 5:
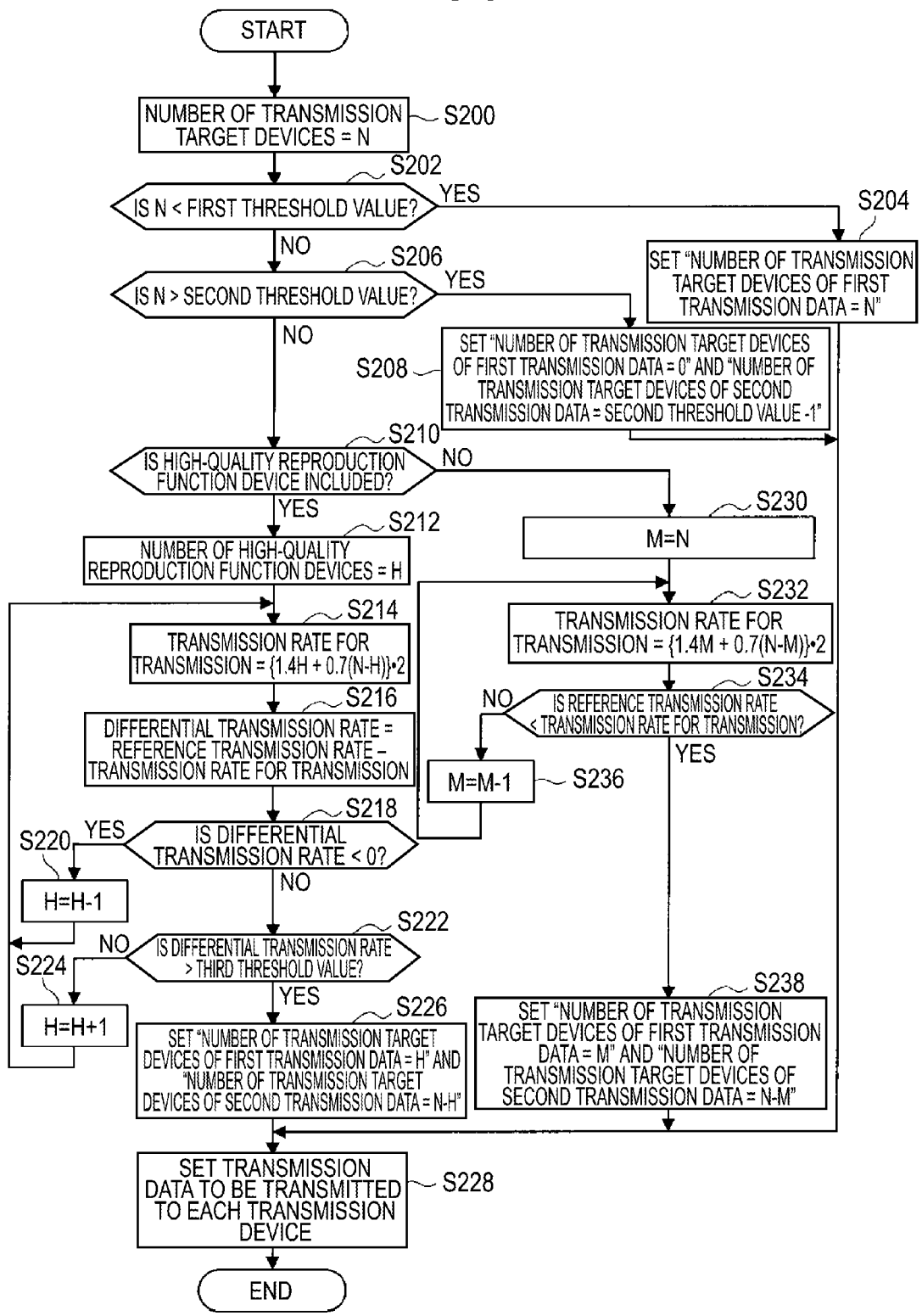
FIG. 5 is a flowchart representing an example of the transmission data setting process of a transmission device according to an embodiment of the present invention.

FIG. 5 is a flowchart representing an example of the transmission data setting process of a transmission device 100 according to an embodiment of the present invention. Hereinafter, an example of the transmission data setting process in a case where the transmission device 100 and the reception devices 200 communicate with each other through wireless communication conforming to IEEE802.11g as an example will be described.

In addition, hereinafter, an example of the transmission data setting process in a case where the transmission device 100 sets either LPCM audio data (an example of transmission data having relatively high reproduction quality) having a transmission rate of 1.4 [Mbps] or DPCM audio data (an example of the transmission data having a reproduction quality lower than that of LPCM) having a transmission rate of 0.7 [Mbps] is set as the transmission data as an example will be described. Hereinafter, the transmission data having a reproduction quality higher than that of the LPCM audio data or the like is referred to as "first transmission data", and transmission data having a reproduction quality lower than that of the first transmission data is referred to as "second transmission data".

The transmission device 100 sets a number corresponding to the number of the reception devices 200 that have transmitted the device information transmitting requests in Step S104 shown in FIG. 2 as the number N (here, N is a positive integer) of the transmission target devices (S200).

When setting the number of the transmission target devices in Step S200, the transmission device 100 determines whether or not the set number N of the transmission target devices is less than a first threshold value (S202). Here, the process of Step S202 corresponds to the process of comparing the number of the transmission target devices and the predetermined threshold value in the process (the transmission data setting process) of (1) described above. Here, in a case where the wireless communication is in conformity with IEEE802.11g, and the first transmission data is LPCM audio data having a transmission rate of 1.4 [Mbps], the number of devices that can transmit the first transmission data so as not to allow the transmission rate to exceed the reference transmission rate is five. Accordingly, in the above-described case, the first threshold value is, for example, set as "the first threshold value=6".

In a case where the number N of the transmission target devices is determined to be less than the first threshold value in Step S202, the transmission device 100 sets "the number of the transmission target devices of the first transmission data=N" (S204). Then, the transmission device 100 sets the transmission data to be transmitted to the reception devices 200 based on the process result of Step S204 (S228). Here, in a case where the process of Step S228 is performed based on the process result of Step S204, the transmission device 100 sets the first transmission data to all the reception devices 200 as the transmission targets.

On the other hand, in a case where the number N of the transmission target devices is determined not to be less than the first threshold value in Step S202, the transmission device 100 determines whether or not the number N of the transmission target devices is greater than a second threshold value (S206). Here, the second threshold value according to the embodiment of the present invention, for example, is the value of an upper limit of the transmission target devices in a case where only second transmission data is transmitted to the reception devices 200 so as not to allow the transmission rate for transmission to exceed the reference transmission rate. In a case where the wireless communication is in conformity with IEEE802.11g, and the second transmission data is DPCM audio data having a transmission rate of 0.7 [Mbps], the second threshold value, for example, is set as "the second threshold value=10".

In a case where the number N of the transmission target devices is determined to be greater than the second threshold value in Step S206, the transmission device 100 sets "the number of the transmission target devices of the first transmission data=0" and "the number of the transmission target devices of the second transmission data=the second threshold value−1" (S208). Then, the transmission device 100 sets the transmission data to be transmitted to the reception devices 200 based on the process result of Step S208 (S228). Here, in a case where the process of Step S228 is performed based on the process result of Step S208, when the number N of the transmission target devices is equal to or less than the second threshold value, the transmission device 100 sets the second transmission data to all the reception devices 200 as the transmission targets. On the other hand, when the number N of the transmission target devices is greater than the second threshold value, the transmission device 100, for example, arbitrarily selects the reception devices 200 corresponding to the second threshold value from among the reception devices 200 as the reception devices 200 and sets the second transmission data to the selected reception devices 200. In a case where the second transmission data is set to the selected reception devices 200 as described above, no transmission data is transmitted to the reception devices 200 that are not selected.

On the other hand, in a case where the number N of the transmission target devices is determined not to be greater than the second threshold value in Step S206, the transmission device 100 determines whether a high-quality reproduction function device is included in the reception devices 200 as the transmission target (S210). Here, the transmission device 100 performs the determination of Step S210 by classifying the reception devices 200 based on the device information received in Step S106 shown in FIG. 2.

<Case where High-Quality Reproduction Function Device is Included>

The transmission device 100 sets the number H (here, H is a positive integer) of the high-quality reproduction function devices, for example, based on the result of the classification of the process of Step S210 (S212).

When the number H of the high-quality reproduction function devices is set in Step S212, the transmission device 100 calculates a transmission rate for transmission (S214). Here, the transmission device 100, for example, calculates the transmission rate by performing calculation of Expression (2).

$$\text{Transmission Rate [Mbps]} = \{1.4 \cdot H + 0.7 \cdot (N-H)\} \cdot 2 \quad (2)$$

When the transmission rate for transmission is calculated in Step S214, the transmission device 100 calculates a differential transmission rate (S216). Then, the transmission device 100 determines whether the differential transmission rate calculated in Step S216 is less than zero (S218). Here, the process of Step S218 corresponds to the determination on whether or not the transmission rate for transmission exceeds the reference transmission rate in a case where the first transmission data is transmitted to the reception devices 200 corresponding to the set number H of the high-quality reproduction function devices.

In a case where the differential transmission rate is determined to be less than zero in Step S218, it represents that the transmission rate for transmission exceeds the reference transmission rate. Accordingly, the transmission device 100 updates the number H of the high-quality reproduction function devices to H=H−1 (S220). Then, the transmission device 100 repeats the process starting from Step S214.

In addition, in the case where the differential transmission rate is determined to be less than zero in Step S218, it represents that there is spare bandwidth. Accordingly, the transmission device 100 determines whether or not the differential transmission rate is greater than a third threshold value (S222). Here, the third threshold value according to the embodiment of the present invention is set so as to determine whether or not there is spare bandwidth some degree for which the first transmission data can be transmitted. The third threshold value according to the embodiment of the present invention is, for example, 1.4 [Mbps] (an example of the transmission rate of the first transmission data) that is the transmission rate of LPCM shown in FIG. 5.

In a case where the differential transmission rate is determined to be greater than the third threshold value in Step S222, it represents that there is spare bandwidth to some degree for which the first transmission data can be transmitted. Accordingly, the transmission device 100 updates the number H of the high-quality reproduction function devices to H=H+1 (S224). Then, the transmission device 100 repeats the process starting from Step S214.

On the other hand, in a case where the differential transmission rate is determined not to be greater than the third threshold value in Step S222, the transmission device 100 sets "the number of the transmission target devices of the first transmission data=H" and "the number of the transmission target devices of the second transmission data=N−H" (S226). Then, the transmission device 100 sets the transmission data to be transmitted to the reception devices 200 based on the process result of Step S226 (S228).
<Case where High-Quality Reproduction Function Device is not Included>

The transmission device 100 sets the number M (here, M is a positive integer) of the high-quality reproduction function devices to the number N of the transmission target devices (S230).

When the number of the high-quality reproduction function devices is set in Step S230, the transmission device 100 calculates the transmission rate for transmission (S232). Here, the transmission device 100 calculates the transmission rate, for example, by performing calculation of the following Expression (3).

$$\text{Transmission Rate [Mbps]} = \{1.4 \cdot M + 0.7 \cdot (N-M)\} - 2 \quad (3)$$

When the transmission rate for transmission is calculated in Step S232, the transmission device 100 determines whether or not the transmission rate for transmission is greater than the reference transmission rate (S234).

In a case where the transmission rate for transmission is determined to be greater than the reference transmission rate in Step S234, the transmission device 100 updates the number M of the high-quality reproduction function devices to M=M−1 (S236). Then, the transmission device 100 repeats the process starting from Step S232.

On the other hand, in a case where the transmission rate for transmission is determined not to be greater than the reference transmission rate in Step S234, the transmission device 100 sets "the number of the transmission target devices of the first transmission data=M" and "the number of the transmission target devices of the second transmission data=N−M" (S238). Then, the transmission device 100 sets the transmission data to be transmitted to each of the reception devices 200 based on the process result of Step S238 (S228).

The transmission device 100 sets the transmission data to each of the reception devices 200 as the transmission targets, for example, by performing the process represented in FIG. 5 as the transmission data setting process. Here, the transmission device 100 sets the number of the transmission target devices of the first transmission data and the number of the transmission target devices of the second transmission data such that the transmission rate for transmission does not exceed the reference transmission rate, and the transmission data having relatively high reproduction quality is transmitted to the reception devices 200 as the transmission targets. Accordingly, as the transmission device 100 performs the process shown in FIG. 5, the transmission device 100 can concurrently transmit the transmission data having relatively high reproduction quality to the reception devices while preventing the degradation of user convenience. In addition, it is apparent that the transmission data setting process of the transmission device 100 according to the embodiment of the present invention is not limited to the process represented in FIG. 5.

An example of the process relating to the data transmission approach of the communication system 1000 will be described with reference to FIG. 2 again. When the transmission data to be transmitted to each reception device 200 as the transmission targets is set in Step S108, the transmission device 100 performs a synchronization process for concurrently transmitting the transmission data to the reception devices 200 (S110A, S110C, S110D, and S110n; hereinafter, collectively referred to as "S110"). Here, as an example of the synchronization process according to the embodiment of the present invention, there is a process in which the transmission device 100 transmits a transmission start notification including transmission start time information and reproduction start time information of the transmission data, and the like, and the reception device 200 performs a process relating to preparation of reproduction of the transmission data and makes a response for the transmission start notification in accordance with the transmission start notification.

When completing the synchronization process in Step S110, the transmission device 100 concurrently transmits the corresponding transmission data set in Step S108 to the reception devices 200 as the transmission targets (S112A, S112C, S112D, and S112n; hereinafter, collectively referred to as "S112"). Here, FIG. 2 represents an example in which the transmission device 100 transmits the second transmission data to the reception device 200D that is a general-quality reproduction function device and transmits the first transmission data to the reception device 200A that is a high-quality reproduction function device, the reception device 200C that is a general-quality reproduction function device, and another reception device 200. In FIG. 2, for convenience of the description, Steps S112A, S112C, S112D, and S112n are performed in a divided state. However, the transmission device 100 simultaneously performs the process of Step S112. In other words, the transmission device 100 performs the process of Step S112 simultaneously (or approximately simultaneously).

FIG. 6 is a diagram illustrating an example of the format of data transmitted by a transmission device 100 according to the embodiment of the present invention. As shown in FIG. 6, the transmission device 100, for example, transmits an identifier, length information, codec information, and transmission data in Step S112. Here, the identifier is information used for identifying a protocol, and the length information, for example, represents a data length of the codec information. In addition, the codec information represents the codec of the transmission data, and the transmission data is real data such as audio data or image data that is reproduced in the reception device 200.

The transmission device 100, in Step S112, generates data that, for example, conforms to the format shown in FIG. 6 and transmits the generated data to the corresponding reception device 200. In addition, the transmission device 100, in Step S112, generates the first transmission data and the second transmission data based on the content data that is, for example, stored in the storage unit (to be described later). Alternatively, the transmission device 100 may generate the first transmission data and the second transmission data in advance. In addition, it is apparent that the format of the data transmitted in Step S112 by the transmission device 100 according to the embodiment of the present invention is not limited to that shown in FIG. 6.

An example of the process relating to the data transmission approach of the communication system 1000 will be described with reference to FIG. 2 again. The reception devices 200 that have received the transmission data concurrently transmitted from the transmission device 100 in Step S112 reproduce the received transmission data (S114A, S114C, S114D, and S114n; hereinafter, collectively referred to as "S114"). Here, the reception device 200 performs a reproduction process based on the result of the synchronization process of Step S110. Accordingly, in the communication system 1000, the transmission data is reproduced in the reception devices 200 simultaneously (approximately simultaneously).

In the communication system 1000, for example, the process shown in FIG. 2 is performed. Here, the transmission device 100 sets the transmission data for each reception device 200 in Step S108 such that the transmission rate for transmission does not exceed the reference transmission rate, and transmission data having relatively high reproduction quality is transmitted to the reception device 200 as the transmission target. In addition, the transmission device 100, in Step S112, concurrently transmits the transmission data set in Step S108 to the reception devices 200 as the transmission targets. In other words, the transmission device 100 performs the process (the transmission data setting process) of (1) described above and the process (the transmission process) of (2) described above. Accordingly, for example, by performing the process shown in FIG. 2, the process relating to the data transmission approach according to the above-described embodiment of the present invention is realized in the communication system 1000.

Accordingly, for example, by performing the process shown in FIG. 2, the communication system 1000 capable of concurrently transmitting the transmission data having relatively high reproduction quality to the reception devices 200 while preventing degradation of user convenience is realized. In addition, the process relating to the data transmission approach according to the embodiment of the present invention in the communication system 1000 is not limited to the process shown in FIG. 2. For example, the transmission device 100 may regularly transmit the transmission data to each reception device 200, and each reception device 200 may reproduce the received transmission data.
(Communication System According to Embodiment of Present Invention)

Next, an example of the configurations of the transmission device 100 and the reception device 200 that configure the communication system 1000 capable of realizing the process relating to the data transmission approach according to the above-described embodiment of the present invention will be described.
[Transmission Device 100]

Figure 7:
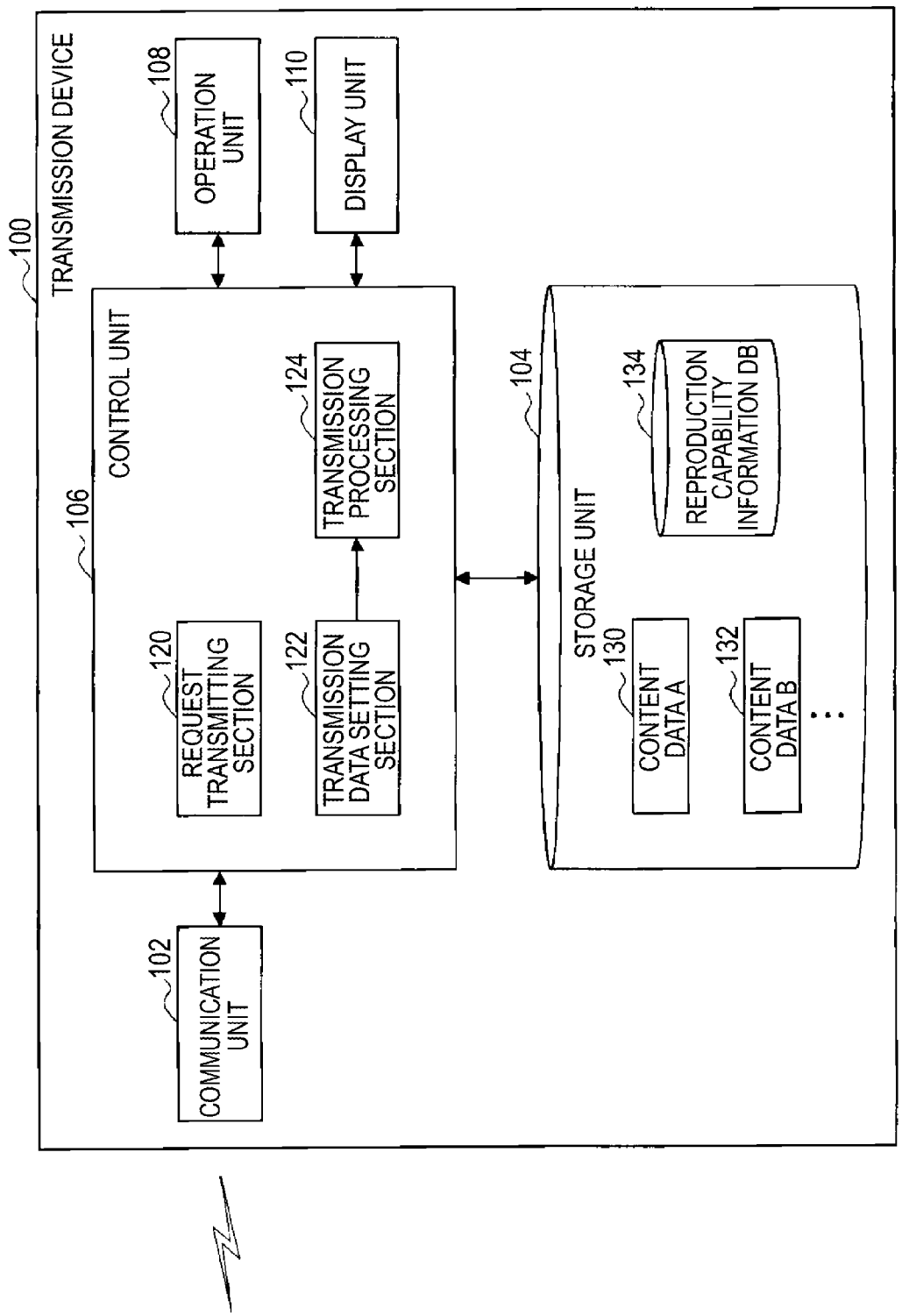
FIG. 7 is a block diagram showing an example of the configuration of the transmission device according to an embodiment of the present invention.

FIG. 7 is a block diagram showing an example of the configuration of the transmission device 100 according to the embodiment of the present invention. The transmission device 100 includes a communication unit 102, a storage unit 104, a control unit 106, an operation unit 108, and a display unit 110.

In addition, the transmission device 100, for example, may include a ROM (Read Only Memory; not shown in the figure), a RAM (Random Access Memory; not shown in the figure), and the like. The transmission device 100 interconnects each constituent element, for example, through a bus as a transmission path of data.

Here, the ROM (not shown in the figure) stores therein a program and control data such as operation parameters that are used by the control unit 106. The RAM (not shown in the figure) primarily stores therein a program executed by the control unit 106 and the like.

[Example of Hardware Configuration of Transmission Device 100]

Figure 8:
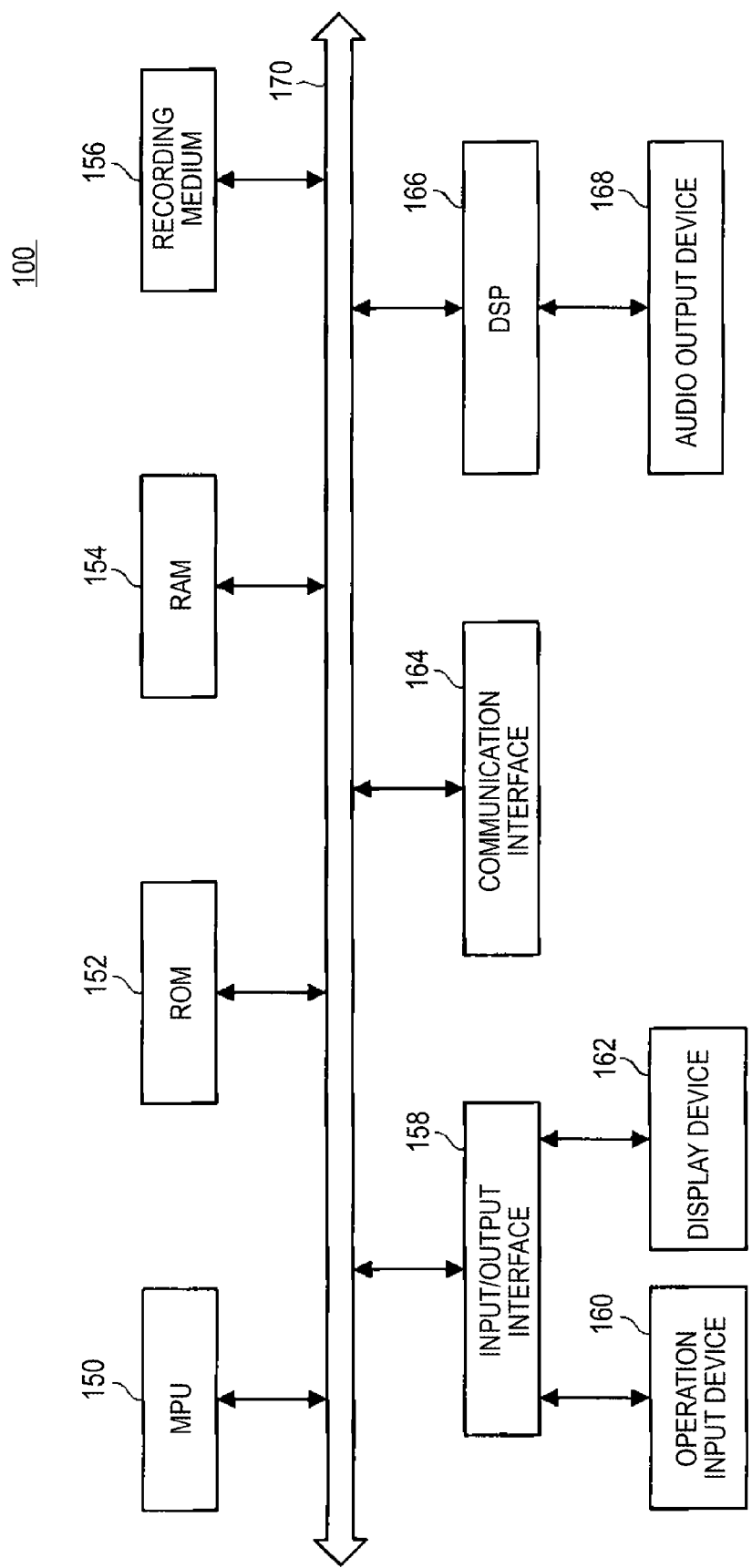
FIG. 8 is a diagram illustrating an example of the hardware configuration of a transmission device according to an embodiment of the present invention.

FIG. 8 is a schematic diagram illustrating an example of the hardware configuration of a transmission device 100 according to an embodiment of the present invention. Referring to FIG. 8, the transmission device 100, for example, includes an MPU 150, a ROM 152, a RAM 154, a recording medium 156, an input/output interface 158, an operation input device 160, a display device 162, a communication interface 164, a DSP 166, and an audio output device 168. In addition, the transmission device 100 interconnects the constituent elements, for example, through a bus 170 as a transmission path of data.

The MPU 150 is configured by an MPU (Micro Processing Unit), an integrated circuit in which a plurality of circuits for realizing a control function are integrated, or the like and serves as a control unit 106 that controls the overall operation of the transmission device 100. In addition, the MPU 150 may serve as a request transmitting section 120, a transmission data setting section 122, and a transmission processing section 124 of the transmission device 100, which will be described later.

The ROM 152 stores therein a program and control data such as operation parameters used by the MPU 150, data of various threshold values according to the embodiment of the present invention, and the like. In addition, the RAM 154, for example, primarily stores therein a program executed by the MPU 150 and the like.

The recording medium 156 serves as the storage unit 104 and, for example, stores therein various types of data such as content data that becomes a base of the transmission data, a reproduction capability information DB in which reproduction capability information is recorded in a database format, and an application. Here, examples of the recording medium 156 include a magnetic recording medium such as a hard disk and nonvolatile memories such as an EEPROM (Electrically Erasable and Programmable Read Only Memory), a flash memory, an MRAM (Magnetoresistive Random Access Memory), an FeRAM (Ferroelectric Random Access Memory), and a PRAM (Phase change Random Access Memory). However, the recording medium 156 is not limited thereto. In addition, the transmission device 100 may include a recording medium 156 that can be detachably attached to the transmission device 100.

The input/output interface 158, for example, allows connections of the operation input device 160 and the display device 162. The operation input device 160 serves as the operation unit 108, and the display device 162 serves as the display unit 110. Here, examples of the input/output interface 158 include a USB terminal, a DVI (Digital Visual Interface) terminal, an HDMI (High-Definition Multimedia Interface) terminal, various processing circuits, and the like. In addition, the operation input device 160, for example, may be provided on the transmission device 100 so as to be connected to the input/output interface 158 inside the transmission device 100. Examples of the operation input device 160 include buttons, arrow keys, a rotary-type selector such as a jog dial, and a combination thereof. In addition, the display device 162, for example, may be provided on the transmission device 100 so as to be connected to the input/output interface 158 inside the transmission device 100. Examples of the display device 162 include a liquid crystal display (LCD), an organic EL (ElectroLuminescence) display (also termed an OLED display (Organic Light Emitting Diode display)) and the like. In addition, it is apparent that the input/output interface 158 can be connected with an operation input device (for example, a keyboard, a mouse, or the like) or a display device (for example, an external display or the like) as an external device of the transmission device 100. In addition, the display device 162 may be a device such as a touch screen that enables a display and a user operation.

The communication interface 164 is a communication unit that is included in the transmission device 100 and serves as the communication unit 102 that is used for communicating with an external device such as the reception device 200 or a server (not shown in the figure) through a network (or a direct connection) in a wired or wireless manner. Here, examples of the communication interface 164 include an IEEE802.11g port and a transmission/reception circuit (wireless communication), an IEEE802.15.1 port and a transmission/reception circuit (wireless communication), a communication antenna and an RF circuit (wireless communication), a LAN terminal and a transmission/reception circuit (wired communication) and the like. In addition, the transmission device 100, for example, may have a plurality of communication interfaces such as a communication interface for communicating with the reception device 200, a communication interface for communicating with an external device such as a server (not shown in the figure) and the like.

Here, examples of a network according to an embodiment of the present invention include a wired network such as a LAN (Local Area Network) or a WAN (Wide Area Network), a wireless network such as a wireless WAN (WWAN; Wireless Wide Area Network) or a wireless MAN (WMAN; Wireless Metropolitan Area Network) through a base station, the Internet using a communication protocol such as a TCP/IP (Transmission Control Protocol/Internet Protocol) or the like.

The DSP 166 serves as a reproduction processing unit (not shown in the figure) that reproduces content data stored in the recording medium 156 or content data received by the communication interface 164. The DSP 166 is configured by a DSP (Digital Signal Processor) or various processing circuits and processes sound data. In addition, the audio output device 168 serves as an audio output unit (not shown in the figure) that outputs a sound corresponding to the sound data and outputs the sound corresponding to the sound data processed by the DSP 166. Here, examples of the audio output device include an amplifier, a speaker and the like.

The transmission device 100 performs the process relating to the data transmission approach according to the embodiment of the present invention, for example, by using the configuration shown in FIG. 8. In addition, the hardware configuration of the transmission device 100 according to the embodiment of the present invention is not limited to that shown in FIG. 8. For example, the transmission device 100 may serve as a reproduction processing unit (not shown in the figure) and include an image processing circuit that processes image data. In addition, in the configuration in which the transmission device 100 does not include the reproduction processing unit (not shown in the figure) and the audio output unit (not shown in the figure), a configuration in which the DSP 166, the audio output device 168, or the image processing circuit is not included may be used.

Referring back to FIG. 7, the constituent elements of the transmission device 100 will be described. The communication unit 102 is a communication unit included in the transmission device 100 and performs communication with an external device such as the reception device 200 or a server (not shown in the figure) through a network (or a direct connection) in a wired or wireless manner. The communication of the communication unit 102 is controlled, for example, by the control unit 106. Here, examples of the communication unit 102 include an IEEE802.11g port and a transmission/reception circuit (wireless communication) and a LAN terminal and a transmission/reception circuit (wired communication).

The storage unit 104 is a storage unit that is included in the transmission device 100. Here, examples of the storage unit 104 include a magnetic recording medium such as a hard disk, a non-volatile memory such as a flash memory and the like.

In addition, the storage unit 104 stores therein various types of data such as content data, a reproduction capability information DB in which the reproduction capability information is recorded in a database format, an application and the like. FIG. 7 represents an example in which content data A130, content data B132, . . . , and the reproduction capability information DB134 are stored in the storage unit 104.

The control unit 106, for example, is configured by an MPU, an integrated circuit in which various processing circuits are integrated or the like and serves to control the overall operation of the transmission device 100. In addition, the control unit 106 includes a request transmitting section 120, a transmission data setting section 122, and a transmission processing section 124 and serves to primarily perform the process relating to the data transmission approach according to the embodiment of the present invention.

The request transmitting section 120 generates various requests such as a communication request and a device information transmitting request, which are shown in FIG. 2, and a reproduction capability information acquiring request and transmits the various generated requests to the communication unit 102.

The transmission data setting section 122 serves to primarily perform the process (the transmission data setting process) of (1) described above. More specifically, the transmission data setting section 122, for example, compares the number of transmission target devices and a predetermined threshold value and sets the transmission data for each reception device 200 such that the transmission rate for transmission does not exceed the reference transmission rate, and the transmission data having relatively high reproduction quality is transmitted to the reception devices 200 as the transmission targets, based on the result of the comparison.

The transmission processing section 124 serves to primarily perform the process (the transmission process) of (2) described above. More specifically, the transmission processing section 124 concurrently transmits the transmission data set by the transmission data setting section 122 to the corresponding reception devices 200 as the transmission targets.

The control unit 106 serves to primarily perform the process relating to the data transmission approach according to the embodiment of the present invention, for example, by including the request transmitting section 120, the transmission data setting section 122, and the transmission processing section 124. In addition, the configuration of the control unit 106 included in the transmission device 100 according to the embodiment of the present invention is not limited to that shown in FIG. 7. For example, the control unit 106 according to the embodiment of the present invention may include a reproduction processing section (not shown in the figure) that reproduces content data.

The operation unit 108 is an operation unit that is included in the transmission device 100 so as to enable a user operation. The transmission device 100 enables a user operation by including the operation unit 108 and can perform a process desired by the user in accordance with the user operation. Here, examples of the operation unit 108 include buttons, arrow keys, a rotary-type selector such as a jog dial, a combination thereof, and the like.

The display unit 110 is a display unit that is included in the transmission device 100 and displays various types of information on a display screen. Examples of a screen displayed on the display screen of the display unit 110 include an operation screen used for performing a desired operation for the transmission device 100, a content reproducing screen according to reproduction of the content data, and the like. Here, examples of the display unit 110 include an LCD, an organic EL display, and the like. In addition, in the transmission device 100, the display unit 110 may be configured, for example, by a touch screen. In the above-described case, the display unit 110 serves as an operation display unit that can allow both user operation and display.

The transmission device 100 can realize the process relating to the data transmission approach according to the embodiment of the present invention, for example, by using the configuration shown in FIG. 7. Accordingly, the transmission device 100 can concurrently transmit the transmission data having relatively high reproduction quality to the reception devices 200 while preventing the degradation of user convenience, for example, by using the configuration shown in FIG. 7. In addition, the configuration of the transmission device 100 according to the embodiment of the present invention is not particularly limited to the configuration shown in FIG. 7.

[Reception Device 200]

Figure 9:
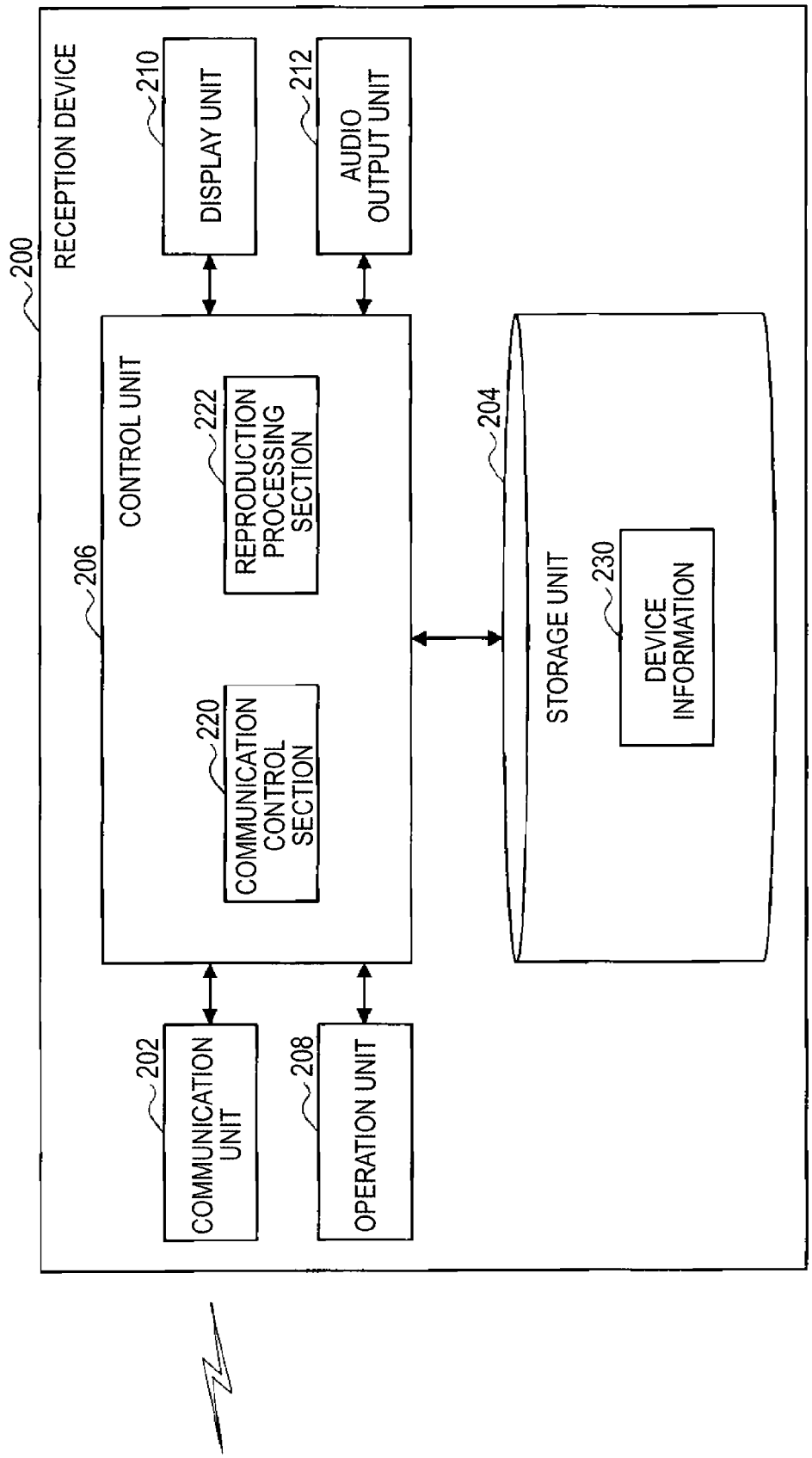
FIG. 9 is a block diagram showing an example of the configuration of the reception device according to an embodiment of the present invention.

FIG. 9 is a block diagram showing an example of the configuration of the reception device 200 according to the embodiment of the present invention. The reception device 200 includes a communication unit 202, a storage unit 204, a control unit 206, an operation unit 208, a display unit 210, and an audio output unit 212.

In addition, the reception device 200, for example, may include a ROM (not shown in the figure), a RAM (not shown in the figure), and the like. The reception device 200 interconnects the constituent elements, for example, through a bus as a transmission path of data.

Here, the ROM (not shown in the figure) stores therein a program and control data such as operation parameters that are used by the control unit. The RAM (not shown in the figure) primarily stores therein a program executed by the control unit and the like.

[Example of Hardware Configuration of Reception Device 200]

The reception device 200, for example, has a hardware configuration that is similar to that of the transmission device 100 shown in FIG. 8. In a case where the above-described configuration is employed, in the reception device 200, an MPU and a DSP serve as the control unit 206, and a recording medium serves as the storage unit 204. In addition, in the case where the above-described configuration is employed, in the reception device 200, an operation input device 160 serves as the operation unit 208, and a display device 162 serves as the display unit 210. In addition, in the case where the above-described configuration is employed, in the reception device 200, a communication interface 164 serves as the communication unit 202, and an audio output device 168 serves as the audio output unit 212. It is apparent that the configuration of the reception device 200 according to the embodiment of the present invention is not limited to the configuration that is similar to that of the transmission device 100 shown in FIG. 8.

The communication unit 202 is a communication unit that is included in the reception device 200 and communicates with an external device such as the transmission device 100 or a server (not shown in the figure) through a network (or a direct connection) in a wired or wireless manner. In addition, the communication of the communication unit 202, for example, is controlled by the control unit 206. Here, examples of the communication unit 202 include an IEEE802.11g port and a transmission/reception circuit (wireless communication), a LAN terminal and a transmission/reception circuit (wired communication), and the like.

The storage unit 204 is a storage unit that is included in the reception device 200. Here, examples of the storage unit 204 include a magnetic recording medium such as a hard disk and a non-volatile memory such as a flash memory.

In addition, the storage unit 204 stores therein various types of data such as the device information, the transmission data transmitted from the transmission device 100, and an application. FIG. 9 represents an example in which the device information 230 is stored in the storage unit 204.

The control unit 206, for example, is configured by an MPU or an integrated circuit in which various processing circuits are integrated and serves to control the overall operation of the reception device 200. In addition, the control unit 206 includes a communication control section 220 and a reproduction processing section 222 and, for example, primarily performs the process relating to the reception device 200 shown in FIG. 2.

The communication control section 220 primarily performs the process relating to communication with an external device such as the transmission device 100 by controlling the communication unit 202. More specifically, for example, in a case where the communication unit 202 receives various requests transmitted from the transmission device 100, the communication control section 220 performs processes corresponding to the received various requests and transmits responses according to the various requests to the communication unit 202.

The reproduction processing section 222 serves to reproduce content data. More specifically, for example, in a case where the reception unit 202 receives the data, which is shown in FIG. 6, transmitted by the transmission device 100, the reproduction processing section 222 reproduces the transmission data based on the codec information. Then, the reproduction processing section 222 displays an image represented by image data corresponding to a result of the process on the display unit 210 and outputs a sound represented by the sound data corresponding to the result of the process to the audio output unit 212.

The control unit 206 serves to primarily perform the process, for example, relating to the reception device 200 shown in FIG. 2 by including the communication control section 220 and the reproduction processing section 222.

The operation unit 208 is an operation unit that is included in the reception device 200 so as to enable a user operation. The reception device 200 enables a user operation by including the operation unit 208 and can perform a process desired by the user in accordance with the user operation. Here, examples of the operation unit 208 include buttons, arrow keys, a rotary-type selector such as a jog dial, a combination thereof, and the like.

The display unit 210 is a display unit that is included in the reception device 200 and displays various types of information on a display screen. Examples of a screen displayed on the display screen of the display unit 210 include an operation screen used for performing a desired operation for the reception device 200, a content reproducing screen according to reproduction of the received transmission data or the content data, and the like. Here, examples of the display unit 210 include an LCD, an organic EL display, and the like.

The audio output unit 212 outputs a sound corresponding to the sound data processed by the reproduction processing section 222. Examples of the audio output unit 212 include an amplifier, a speaker, and the like.

The reception device 200 can perform a process, for example, relating to the reception device 200 shown in FIG. 2, receive the transmission data transmitted from the transmission device 100, and reproduce the transmission data, for example, by employing the configuration shown in FIG. 9.

In addition, the configuration of the reception device 200 according to the embodiment of the present invention is not limited to that shown in FIG. 9. For example, the reception device 200 according to the embodiment of the present invention may perform the process relating to the data transmission approach according to the embodiment of the present invention by including the request transmitting section 120, the transmission data setting section 122, and the transmission processing section 124 shown in FIG. 7. In other words, the reception device 200 according to the embodiment of the present invention may have the function as the transmission device 100 according to the embodiment of the present invention.

As above, the communication system 1000 according to the embodiment of the present invention includes the transmission device 100 and the reception device 200. The transmission device 100 concurrently transmits the transmission data to the reception device 200 by performing the process (the transmission data setting process) of (1) and the process (the transmission process) of (2) described above. Here, the transmission device 100, in the process (the transmission data setting process) of (1) described above, sets the transmission data for each reception device 200 such that the transmission rate for transmission does not exceed the reference transmission rate, and the transmission data having relatively high reproduction quality is transmitted to the reception devices 200 as the transmission targets. Accordingly, in the communication system 1000, since the transmission rate for transmission does not exceed the reference rate, an undesirable situation such as an interrupt of audio or image reproduced by the reception device 200 does not occur. In addition, in the communication system 1000, transmission data having relatively high reproduction quality is transmitted to the reception devices 200 as the transmission targets.

Therefore, by performing the process (the transmission data setting process) of (1) and the process (the transmission process) of (2) described above by using the transmission device 100, a communication system 1000 capable of concurrently transmitting transmission data having relatively high reproduction quality to the reception devices 200 while preventing degradation of user convenience is realized.

In addition, in the communication system 1000, in the process (the transmission data setting process) of (1) described above, the transmission device 100 sets the transmission data to each reception device 200 based on the device information acquired from the reception device 200 as the transmission target. Here, on a premise that the transmission rate for transmission does not exceed the reference transmission rate, the transmission device 100 may specify the content reproducing capabilities of each reception device 200 based on the acquired device information and set transmission data having a data format that is appropriate to the reproduction capability of each reception device 200. In a case where the transmission data is set as described above, the differential transmission rate can be further increased, whereby the network load can be suppressed. Therefore, the reproduction capability of each reception device 200 can be exhibited without being pulled back to the reception device 200 that becomes a bottle neck.

[Modified Example of Communication System 1000]

In the description presented above, for example, as shown in FIG. 1, a configuration is shown in which the communication system 1000 includes the transmission device 100 and the reception device 200, and the transmission device 100 performs the process (the transmission data setting process) of (1) described above and the process (the transmission process) of (2) described above. However, a communication system according to an embodiment of the present invention is not limited to the above-described configuration. For example, a communication system according to an embodiment of the present invention may have a configuration in which a control device performing the process (the transmission data setting process) of (1) described above, a transmission device performing the process (the transmission process) of (2) described above based on the process result of the control device, and the reception devices 200 are included. Even in such a configuration, a communication system 1000 capable of concurrently transmitting the transmission data having relatively high reproduction quality to the reception devices 200 while preventing degradation of user convenience can be realized.

As above, although the transmission device 100 has been described as a constituent element configuring the communication system 1000 according to the embodiment of the present invention, embodiments of the present invention are not limited thereto. An embodiment of the present invention, for example, can be applied to various devices including a computer such as a PC (Personal Computer), a server, or a PDA (Personal Digital Assistant), a mobile-type communication device such as a cellular phone or a PHS (Personal Handyphone System), a video/music reproducing device, a video/music recording and reproducing device, a mobile-type game device, a game device, and the like.

In addition, although the reception device 200 has been described as a constituent element configuring the communication system 1000 according to the embodiment of the present invention, an embodiment of the present invention is not limited thereto. An embodiment of the present invention, for example, can be applied to various devices including a computer such as a PC, a mobile-type communication device such as a cellular phone, a video/music reproducing device, a video/music recording and reproducing device, a mobile-type game device, a game device, and the like.

(Program According to Embodiment of Present Invention)

According to a program that is used to allow a computer to function as the transmission device according to the embodiment of the present invention, transmission data having a relatively high-quality reproduction function device can be concurrently transmitted to the reception devices while preventing the degradation of user convenience. Accordingly, by using a program that allows a computer to function as the transmission device according to the embodiment of the present invention, a communication system that concurrently transmits the transmission data having relatively high reproduction quality to the reception devices while preventing degradation of user convenience is realized.

As above, although the preferred embodiments of the present invention have been described with reference to the accompanying drawings, it is apparent that the present invention is not limited thereto. In addition, it is apparent that those skilled in the art can make various changes or modified examples within the scope defined by the claims, and it is understood that such changes and modified examples naturally belong to the technical scope of the present invention.

For example, a transmission device according to an embodiment of the present invention may individually include the request transmitting section 120, the transmission data setting section 122, and the transmission processing section 124 shown in FIG. 7 (for example, these sections are implemented by individual processing circuits).

In addition, in the description presented above, the program (computer program) that is used to allow a computer to function as a transmission device according to an embodiment of the present invention has been described. However, according to an embodiment of the present invention, a storage medium having the above-described program stored thereon can be additionally provided.

Since the above-described configuration represents an exemplary embodiment of the present invention, the configuration naturally belongs to the technical scope of the present invention.

The present application contains subject matter related to that disclosed in Japanese Priority Patent Application JP 2010-045552 filed in the Japan Patent Office on Mar. 2, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission device, comprising:
at least one processor configured to:
communicate with a plurality of reception devices;
determine a first number of the plurality of reception devices based on a number of communication signals received from the plurality of reception devices;
compare the first number of the plurality of reception devices with a first threshold value;
transmit to each of the plurality of reception devices, a device information request that requests corresponding device capability information from each of the plurality of reception devices;
receive the device capability information from each of the plurality of reception devices based on the transmitted device information request,
wherein the device capability information indicates a content reproduction capability of each of the plurality of reception devices;
determine a subset of the plurality of reception devices based on the device capability information and the comparison of the first number of the plurality of reception devices with the first threshold value;
transmit a transmission start notification to each reception device of the subset of the plurality of reception devices, wherein the transmission start notification comprises at least a transmission start time of first transmission data; and
transmit the first transmission data, upon the transmission of the transmission start notification, to each reception device of the subset of the plurality of reception devices.

2. The transmission device according to claim 1,
wherein the first transmission data have a reproduction quality based on a second number of reception devices of the subset of the plurality of reception devices, and
wherein the reproduction quality is lower than a threshold reproduction quality.

3. The transmission device according to claim 1, wherein the at least one processor is further configured to store the device capability information representing the content reproduction capability of each of the plurality of reception devices.

4. The transmission device according to claim 1, wherein the at least one processor is further configured to transmit the device capability information, indicating the content reproduction capability of each of the plurality of reception devices, to an external device that stores the device capability information.

5. The transmission device according to claim 1,
wherein the at least one processor is further configured to transmit the first transmission data having a high reproduction quality to a reception device having a first content reproduction capability,
wherein the reproduction quality is higher than a threshold reproduction quality, and
wherein the first content reproduction capability is higher than a threshold content reproduction capability.

6. The transmission device according to claim 1,
wherein the at least one processor is further configured to transmit at least one of uncompressed audio data or compressed audio data as the first transmission data, and
wherein the compressed audio data is generated based on a compression method.

7. The transmission device according to claim 1,
wherein the at least one processor is further configured to transmit a type of image data from a plurality of types of image data as the first transmission data, based on image data representing a moving image for transmission, and
wherein the plurality of types of image data have one of a plurality of resolutions or a plurality of compression formats.

8. The transmission device according to claim 1,
wherein the at least one processor is further configured to transmit a type of image data from a plurality of types of image data as the first transmission data, based on that image data representing a still image for transmission, and
wherein the plurality of types of image data have a plurality of data sizes.

9. A data transmitting method, comprising:
communicating with a plurality of reception devices;
determining a number of the plurality of reception devices based on a number of communication signals received from the plurality of reception devices;
comparing the number of the plurality of reception devices with a threshold value;
transmitting a device information request to each of the plurality of reception devices;
receiving device capability information from each of the plurality of reception devices based on the device information request transmitted to the each of the plurality of reception devices, wherein the device capability information indicates a content reproducing capability of each of the plurality of reception devices;
determining a subset of the plurality of reception devices based on the device capability information and the comparison of the number of the plurality of reception devices with the threshold value;
transmitting a transmission start notification to each reception device of the subset of the plurality of reception devices, wherein the transmission start notification comprises at least a transmission start time of transmission data; and
transmitting the transmission data, upon the transmission of the transmission start notification, to each reception device of the subset of the of the plurality of reception devices.

10. A communication system, comprising:
a transmission device; and
a plurality of reception devices,
  wherein the transmission device comprises at least one processor configured to:
    communicate with the plurality of reception devices;
    determine a number of the plurality of reception devices based on a number of communication signals received from the plurality of reception devices;
    compare the number of the plurality of reception devices with a threshold value;
    transmit to each of the plurality of reception devices, a device information request that request corresponding device capability information from each of the plurality of reception devices;
    receive the device capability information from each of the plurality of reception devices based on the transmitted device information request,
      wherein the device capability information indicates a content reproduction capability of each of the plurality of reception devices;
    determine a subset of the plurality of reception devices based on the device capability information and the comparison of the number of the plurality of reception devices with the threshold value;
    transmit a transmission start notification to each reception device of the subset of the plurality of reception devices, wherein the transmission start notification comprises at least a transmission start time of transmission data; and
    transmit the transmission data, upon the transmission of the transmission start notification, to each reception device of the subset of the plurality of reception devices.

11. The transmission device according to claim 1,
wherein the at least one processor is further configured to transmit a plurality of types of the first transmission data that correspond to a plurality of reproduction qualities,
wherein the plurality of reproduction qualities comprise at least one of a first reproduction quality or a second reproduction quality, and
wherein the first reproduction quality is higher than the second reproduction quality.

12. The transmission device according to claim 1,
wherein the at least one processor is further configured to transmit the first transmission data having a reproduction quality to each reception device of the subset of the plurality of reception devices having a first content reproduction capability based on a second number of reception devices, of the subset of the plurality of reception devices, is greater than a second threshold value,
wherein the reproduction quality is higher than a threshold reproduction quality, and
wherein the first content reproduction capability is higher than a threshold content reproduction capability.

13. The transmission device according to claim 1,
wherein the at least one processor is further configured to transmit the first transmission data having a reproduction quality to each reception device of the subset of the plurality of reception devices having a first content reproduction capability based on a second number of reception devices, of the subset of the plurality of reception devices, is greater than a second threshold value,
wherein the reproduction quality is lower than a threshold reproduction quality, and
wherein the first content reproduction capability is lower than a threshold content reproduction capability.

14. The transmission device according to claim 1,
wherein a type of the first transmission data for each of the plurality of reception devices is based on a descending order of a relative content reproduction capability of each of the plurality of reception devices, and
wherein the relative content reproduction capability is based on the device capability information indicating the content reproduction capability of each of the plurality of reception devices.

15. The transmission device according to claim 1,
wherein the transmission of the first transmission data is within a transmission rate, and
wherein the transmission rate is based on the second threshold value.

16. The transmission device according to claim 1,
wherein the at least one processor is further configured to determine a relative content reproduction capability of each of the plurality of reception devices, based on the device capability information that indicates the content reproduction capability of each of the plurality of reception devices, and
wherein the first transmission data for each of the plurality of reception devices is determined based on the determined relative content reproduction capability of each of the plurality of reception devices.

17. The transmission device according to claim 16,
wherein the at least one processor is further configured to concurrently transmit the first transmission data to each of the plurality of reception devices based on the comparison and the determined relative content reproduction capability of each of the plurality of reception devices.

18. The transmission device according to claim 16,
wherein the first threshold value indicates a second number of reception devices, and
wherein the at least one processor is further configured to determine the first threshold value based on a transmission rate necessary to concurrently transmit the first transmission data having a reproduction quality to the second number of reception devices.

* * * * *